US006388110B1

(12) United States Patent
Ulrich et al.

(10) Patent No.: US 6,388,110 B1
(45) Date of Patent: May 14, 2002

(54) HIGH OIL CORN PROCESSING

(75) Inventors: James F. Ulrich, Lake Forest, IL (US); Stephan C. Anderson, Minneapolis, MN (US); Ian Purtle, Plymouth, MN (US); Gary Seymour, Howard Lake, MN (US)

(73) Assignee: Cargill, Incorporated, Minneapolis, MN (US)

( * ) Notice: Subject to any disclaimer, the term of this patent is extended or adjusted under 35 U.S.C. 154(b) by 0 days.

(21) Appl. No.: 09/636,481

(22) Filed: Aug. 10, 2000

Related U.S. Application Data

(63) Continuation-in-part of application No. 09/249,280, filed on Feb. 11, 1999.

(51) Int. Cl.$^7$ .................................................. C11B 1/00
(52) U.S. Cl. .................................. 554/13; 554/8; 554/9; 554/12; 554/20; 554/21; 554/22; 426/413; 426/622
(58) Field of Search ................................. 554/227, 8, 9, 554/12, 13, 16, 20, 21, 22; 426/417, 622

(56) References Cited

U.S. PATENT DOCUMENTS

| 3,519,431 A | | 7/1970 | Wayne |
| 3,786,078 A | | 1/1974 | Finley et al. |
| 3,909,288 A | | 9/1975 | Powell et al. |
| 3,939,281 A | | 2/1976 | Schwengers |
| 4,246,184 A | | 1/1981 | Pressick et al. |
| 4,277,411 A | | 7/1981 | Yahl |
| 4,442,034 A | * | 4/1984 | Suzuki et al. |
| 4,456,556 A | | 6/1984 | Grimsby |
| 4,456,557 A | | 6/1984 | Grimsby |
| 4,486,353 A | | 12/1984 | Matsuzaki et al. |
| 4,495,207 A | | 1/1985 | Christianson et al. |
| 5,408,924 A | | 4/1995 | Arendt et al. |
| 5,525,746 A | | 6/1996 | Franke |
| 5,670,678 A | | 9/1997 | Rothbart |

FOREIGN PATENT DOCUMENTS

| EP | 0623100 | 4/1999 |
| GB | 2269084 | 2/1994 |
| GB | 2239150 | 7/1997 |
| JP | 6-32358 | 2/1994 |
| JP | 10-195400 | 7/1998 |
| WO | WO 94/15483 | 7/1994 |
| WO | WO 95/22598 | 8/1995 |
| WO | WO 99/52376 | 10/1999 |

OTHER PUBLICATIONS

Aguilera et al., *JAOCS,* 1986, 63(2):239–243.
Watson, *Corn and Corn Improvement,* 18:881–940 (3$^{rd}$ Ed.).
Watson, et al., *Corn: Chemistry and Technology,* pp. 53–82.
Michael Bockish "Nahrungsfette und –öle", Ulmer Verlag, Stuttgart, DE XP002161904, p. 246; Figure 4.129.

* cited by examiner

Primary Examiner—Deborah D. Carr
(74) Attorney, Agent, or Firm—Leydig, Voit & Mayer LTD

(57) ABSTRACT

A commercial-scale method for processing corn grain includes the steps of flaking corn grain having a total oil content of at least about 8% and extracting a corn oil from the flaked corn grain. Such a method can be effectuated by processing the high oil corn grain using equipment typically used to process soybeans and other similar oilseed types. In this way, processing plants that flake oilseeds can be used to extract corn oil from corn.

31 Claims, No Drawings

HIGH OIL CORN PROCESSING

This application is a continuation-in-part of Ser. No. 09/249,280 Feb. 11, 1999.

FIELD OF THE INVENTION

The invention relates to processing corn. In particular, the invention relates to processing corn to produce a corn oil and/or a meal product.

BACKGROUND OF THE INVENTION

Corn, *Zea mays* L., is grown for many reasons including its use in food and industrial applications. Corn oil is one of many useful products derived from corn. Commercial processing plants utilizing conventional methods for extracting corn oil typically separate the corn seed into its component parts, e.g., endosperm, germ, tipcap, and pericarp, and then extract corn oil from the corn germ fraction.

Although the precise processing steps and types of equipment vary somewhat from plant to plant, commercial corn processing can be classified as either a wet milling or dry milling process. Overall, wet milling is a sophisticated process involving many steps. When isolating the corn oil fraction, corn seed is first steeped in a water/sulfur dioxide ($SO_2$) mixture at an elevated temperature and then passed through degerminating mills to separate out the corn germ. The wet milled germ contains about 50% oil, which is then washed and dried.

Dry milling physically separates the germ and pericarp from the rest of the corn seed. Dry milling can include tempering the seed by adding water followed by drying, cooling, grinding, sifting and aspirating the seed. Degermination is accomplished using a Beall degerminator™, impact mills, granulators or other similar degerminating equipment. The oil content of dry milled germ ranges from about 18% to about 27% oil.

Corn oil is extracted from wet milled or dry milled germ using physical expellers, solvent extractors, or a combination of both. Wet milled germ typically undergoes a two-step extraction because complete oil extraction is often unattainable using a single extraction.

It is also conventional practice to flake and condition corn germ before oil extraction, adding moisture and heating the flaked germ to about 100° C. Flaking and conditioning facilitates almost complete oil extraction.

Both dry and wet milling processes have drawbacks that include high energy costs, expensive equipment, high maintenance costs, and variable oil quality. Other corn oil recovery methods have been attempted, but most have not proven to be commercially feasible. Thus, there exists a need for improved methods that alleviate one or more of the drawbacks associated with conventional corn oil recovery methods.

SUMMARY OF THE INVENTION

In one aspect, the invention features a commercial-scale method for processing corn grain that includes the steps of flaking corn grain and extracting an oil from the flaked corn grain. The corn grain should have an elevated total oil content of at least about 8%. The corn processing method may be effective for producing corn oil and corn meals having defined characteristics.

In one embodiment, the corn grain has a total oil content of at least about 14%. In alternative embodiments, the corn grain has a total oil content of at least about 12%, at least about 10%, or from about 12% to about 30%.

In another embodiment, the corn grain being flaked is whole corn grain. In another embodiment, the corn grain is cracked corn grain.

In another embodiment, the method of processing corn includes an extracting step wherein the flaked corn grain is pressed to extract an oil. Alternatively, the extraction step exposes the flaked corn grain to solvent-based oil extraction. Solvents used to extract miscible or soluble substances from the flaked grain include any of the hexanes, isopropyl alcohol, and ethyl alcohol. Extracting steps can produce a miscella and a corn meal.

In another embodiment, corn meal resulting from the disclosed corn processing method has a fiber content of about 2% to about 8%, e.g., about 3%, a starch content of about 60% to about 70%, e.g., about 65%, and a protein content of about 10% to about 20%, e.g., about 14%, at a moisture content of about 10%. Meal fat content of such corn meal can be from about 0.2% to about 4.0%, e.g., about 1.1%. In alternative embodiments, a subset of the fiber content, starch content, and protein content are measured in the resulting meal. For example, a corn meal may have a fiber content of about 3%, and a protein content of about 14%, at a moisture content of about 10%.

In another embodiment, miscella is desolventized to produce a corn oil. The corn oil may be further refined. The corn oil may have a phosphorous content of less than about 800 parts per million, a free fatty acid content of less than about 0.5%, and/or a neutral oil loss of less than about 3%.

In another embodiment, the corn oil has a light yellow color. Yellow color values may range from about 60 to about 70 and red color values may range from about 6 to about 10, as determined by American Oil and Chemical Society method Cc 13b-93.

In another embodiment, the corn processing method is effective for processing at least about 100 tons of corn per day or for processing from about 100 tons of corn per day to about 3,000 tons of corn per day.

In another aspect, the invention features a method of selling corn seed that includes offering corn seed for sale, or selling corn seed, wherein the corn seed can produce corn grain having a total oil content of at least about 8% and advertising that the corn grain may be processed by flaking the corn grain. In one embodiment, the method includes advertising that the flaking of the corn grain is effective for producing a corn oil.

In another aspect, the invention features a method for marketing corn seed that includes making, using, selling offering for sale, or otherwise providing corn seed wherein the corn seed can produce corn grain having a total oil content of at least about 8% and advertising that the corn grain may be processed by flaking the corn grain. In one embodiment, the method includes advertising that the flaking of the corn grain is effective for producing a corn oil.

In another aspect, a novel method of doing business comprises the steps of buying, purchasing, or offering to buy corn grain having a high oil content for the purpose of processing the purchased grain by flaking the grain and extracting an oil therefrom. In one embodiment, the method includes advertising that a facility flakes high oil corn grain.

In another aspect, the invention features an article of manufacture that includes packaging material, a label accompanying the packaging material and seed corn contained within the packaging material. The packaged seed corn is effective for producing grain having a total oil content of at least about 8%. Labels associated with the article of manufacture indicate that the grain produced by the corn seed can be processed by flaking the grain and extracting an oil therefrom.

The invention also features a method of processing corn grain that comprises the steps of flaking corn grain having a total oil content of at least about 8%, and extracting an oil and a meal from the flaked corn grain. The resulting meal can have a meal fat content from about 0.2% to about 4.0%, or about 0.2% to about 2.0% at a moisture content of about 10%. The meal can have a fiber content of about 2% to about 8% or a protein content of about 10% to about 20% at a moisture content of about 10%. In some embodiments, the resulting meal has a starch content of about 60% to about 70% at a moisture content of about 10%. The extraction step can comprise solvent-based oil extraction of said flaked corn grain, using, e.g., a hexane, isopropyl alcohol, or ethyl alcohol as the solvent. The invention also features a corn meal having a meal fat content of about 0.2% to about 2.0%, or about 0.2% to about 4.0% at a moisture content of about 10%. Such a corn meal can have a protein content of about 10% to about 20%, a fiber content of about 2% to about 8% or a starch content of about 50% to about 70%, at a moisture content of about 10%.

In another aspect, the invention features a method for processing corn grain that comprises the steps of flaking corn grain having a total oil content of at least about 8%, and extracting an oil from the flaked corn grain without using an extrusion (expansion) step. The moisture content of the corn grain can be adjusted to about 10% prior to flaking. The extraction step can comprise solvent-based oil extraction of said flaked corn grain, using, e.g., a hexane, isopropyl alcohol, or ethyl alcohol as the solvent. The extracting step can produce a miscella and a corn meal, and the miscella can be desolventized to produce a crude corn oil. The resulting corn meal can have a meal fat content of about 0.2% to about 4.0% at a moisture content of about 10%, and a light yellow color, i.e., a yellow color value from about 60 to about 70 and a red color value ranging from about 6 to about 10, as determined by American Oil and Chemical Society method Cc 13b-93.

Advantages of the invention include commercially feasible methods for extracting an oil from corn without having to steep the corn or heat the corn to elevated temperatures. Corn oil can be extracted from whole corn grain without having to separate the corn grain into its component parts. The corn oil produced can be of a better quality than the oil produced by known wet or dry milling methods. Wet milling methods currently account for the utilization of about 50,000,000 tons of corn grain per year world wide. Dry milling, on the other hand, accounts for about 3,000,000 tons of corn grain per year. The crude oil can require fewer processing steps. Oil loss during the oil processing can be minimized. Products other than corn oil can still be obtained. Processing equipment used for other seed types, such as soybeans, can be utilized for multiple grains.

Unless otherwise defined, all technical and scientific terms and abbreviations used herein have the same meaning as commonly understood by one of ordinary skill in the art to which this invention pertains. Although methods and materials similar or equivalent to those described herein can be used in the practice or testing of the present invention, suitable methods and materials are described below. All patents, publications and official analytical methods referred to herein are incorporated by reference in their entirety. Additional features and advantages of the invention will be apparent from the following description of illustrative embodiments of the invention and from the claims.

DESCRIPTION OF THE PREFERRED EMBODIMENTS

It has been discovered that corn oil can be rapidly and efficiently extracted on a commercial-scale from corn grain having increased oil content by flaking the corn grain and extracting a corn oil. Useful corn grain for the novel flaking oil processing method has a total oil content greater than about 8%. Increases in the oil content of corn grain may increase flaking efficiency during processing. Suitable flaking equipment and methods include conventional flaking equipment and methods used for flaking soybean and other similar oilseed types. Suitable extracting equipment and methods may include conventional methods used for extracting oil from soybean flakes and other similar oilseed types.

Oil extraction methods for seeds or grain other than corn, such as soybeans, sunflowers, rapeseed, and canola, exclude some of the conventional corn oil processing steps. For example, preprocessing of soybeans for oil extraction includes drying, cracking, and aspirating the soybeans to separate the meats from the seed hulls. The meats are then made into thin flakes by passing the meats through flaking rollers without removing the germ or embryo. Oil is then extracted from the flaked meats using physical or chemical extraction methods.

Corn seed or "grain" harvested from many types of corn plants are useful in the invention. Such corn plants may be hybrids, inbreds, or a population. Useful grain types include, for example, flint corn, popcorn, flour corn, dent corn, white corn, and sweet corn. The grain can be in any form including whole corn, cracked corn, or other processed corn or parts thereof that are amenable to flaking.

Commercial-scale methods and equipment are sufficient for extracting corn oil from at least about 100 tons of corn per day. In some embodiments, the capacity of commercial-scale operations ranges from about 100 tons of corn per day to about 3000 tons of corn per day, or the capacity ranges from about 700 tons of corn per day to about 1700 tons of corn per day. Commercial-scale operations that process greater than about 3000 tons of corn per day are also sufficient.

Useful corn grain has a total oil content greater than about 8%, which is greater than the total oil content of current commodity grade number 2 yellow dent corn, which has an oil content of about 3% to about 5%. Additionally, the total oil content of corn grain suitable for the invention can be, for example, grain having an oil content of at least about 9%, at least about 11%, at least about 12%, at least about 14%, at least about 18%, at least about 20%, from about 8% to about 20% oil, from about 10% to about 30% oil, or from about 14% to about 30%, and values therebetween. Although the oil content can be determined at any moisture content, it is acceptable to normalize the oil content to a moisture content of about 15.5%.

Corn grain having an increased total oil content can be identified and obtained using any method. For example, corn ears can be selected using a near infrared (NIR) oil detector to select corn ears having corn kernels with elevated oil levels or individual corn kernels can be selected using a NIR detector. Selecting individual ears and/or kernels having an elevated oil content may not be cost effective. Preferably, corn seed producing corn plants that yield grain having elevated total oil concentrations can be planted and harvested using known farming methods. Methods for developing corn inbreds, hybrids, and populations that generate corn plants producing grain having elevated oil concentrations are known.

The moisture content of the corn grain can affect the flaking process. It may be necessary to adjust the moisture content of the corn grain to about 10% before flaking the seed. Optimizing the grain moisture content to facilitate efficient processing is within the knowledge of those of ordinary skill in the art.

The oil content of grain, including the fat content of a meal extracted from the grain, can be determined using American Oil and Chemical Society Official Method, 5th edition, March 1998, ("AOCS method") Ba 3-38. AOCS method Ba 3-38 quantitates substances that are extracted by petroleum ether under conditions of the test. The oil content or concentration is the weight percentage of the oil with respect to the total weight of the seed sample. Oil content may be normalized and reported at any desired moisture basis.

Unlike conventional oilseed flaking processing in which the hull component of the seed typically is removed before flaking, pericarp components of corn grain need not be removed before flaking, i.e., whole corn or cracked corn can be flaked. Corn grain is flaked to any useful size. For example, corn grain is flaked in one or more passes through flaking rollers to produce flakes having a final thickness of about 0.01 inches (0.25 mm), although other thicknesses may also be used. Useful flake thicknesses may depend on external limiting parameters such as the oil content of the corn, the moisture content, the corn type, e.g., dent or flint, and the oil extractor type.

Commercial-scale oilseed flaking and oil extraction methods as well as commercial-scale processing plants are known. In particular, suitable flaking and oil extraction methods include the methods and plants used for processing soybeans and similar oilseed types. Useful commercial-scale oilseed flakers can be obtained from French Oil Mill Machinery Company, Piqua, Ohio USA 45456-0920; Roskamp Champion, Waterloo, Iowa; Buhler, based in Switzerland and having offices in Plymouth, Minn. USA; Bauermeister, Inc., Germany; and Consolidated Process Machinery Roskamp Company, on the world wide web at http://www.cpmroskamp.com.

Corn oil is extracted from flaked grain in one or more extraction steps using any extraction method. Preferably, substantially all the oil is extracted in a single extraction (also known as direct extraction) step. Useful extraction methods include solvent extraction (e.g., multistage countercurrent extraction), hydraulic pressing, and expeller pressing. Useful solvents for solvent extraction can include any of the hexanes (e.g., commercial grade hexane which is 65% n-hexane, available from Phillips Petroleum, Bartlesville, Okla., USA), isopropyl alcohol, ethyl alcohol and other similar solvents. For example, corn oil can be extracted from flaked grain using commercial grade hexane in a solvent extractor. Solvent extractors can include both percolation and immersion type extractors.

Substances exiting solvent-based extractors are referred to as wet flakes and miscella. Miscella is a mixture of extracted oil and solvent. The wet flakes are the material that remains after some or all of the solvent-soluble material has been extracted. Wet flakes also contain a quantity of solvent. Solvent is reclaimed from both miscella and wet flakes using known methods. For example, heat is applied to the wet flakes or miscella under a vacuum. Desolventized miscella is referred to as a crude oil that may be stored and/or undergo further processing. Crude oil obtained according to the invention may be refined, bleached and/or deodorized to produce a final oil product. Methods for refining crude oil to obtain a final oil product are known to those of ordinary skill in the art. Crude oil isolated using the flaking methods described herein is of a high quality and involves milder processing steps than is typically used in wet or dry milling methods for processing corn grain to obtain corn oil.

Wet flakes are desolventized, dried, cooled and sized for storage and/or sale as a corn meal using methods known to those of ordinary skill in the art. The corn meal may also be mixed with other meal types or feedstuffs to create a complete feed or other meal or feed types.

Corn oil or meal quality is determined by evaluating one or more quality parameters such as the oil yield, phosphorous content, free fatty acid percentage, the neutral oil loss percentage, color, meal fat, fiber percentage, starch percentage, protein content, and moisture content. Any method can be used to calculate one or more of the quality parameters for evaluating the oil or meal quality.

The phosphorous concentration of crude oil can be determined using AOCS method Ca 12-55. AOCS method Ca 12-55 identifies the phosphorous or the equivalent phosphatide content of an oil by ashing an oil sample in the presence of zinc oxide, followed by the spectrophotometric measurement of phosphorous as a blue phosphomolybdic acid complex. AOCS method Ca 12-55 is applicable to crude, degummed and refined vegetable oils. The phosphorous concentration is converted to phospholipid concentration, i.e., gum concentration, by multiplying the phosphorous concentration by 30. The phosphorus concentration of corn oil produced by the novel method can be less than 800 parts per million (ppm), e.g., about 50 ppm to about 800 ppm, about 100 ppm to about 800 ppm, or about 100 ppm to about 500 ppm.

The free fatty acid percentage of an oil can be determined using AOCS method Ca 5a-40. AOCS method Ca 5a-40 identifies the free fatty acids existing in the oil sample. AOCS method Ca 5a-40 is applicable to all crude and refined vegetable oils, marine oils and animal fats. The free fatty acid percentage in corn oil produced by the novel method can be less than 0.5%, e.g., about 0.1% to about 0.5%, about 0.15% to about 0.5%, or about 0.2% to about 0.5%. The neutral oil loss during processing is determined by adding the gum percentage and the free fatty acid percentage together. The neutral oil loss for corn oil produced by the novel method can be less than 3%, e.g., about 1% to about 3%, about 1.5% to about 3%, or about 2% to about 3%.

Oil color can be determined using AOCS method Cc 13b-45. AOCS method Cc 13b-45 identifies the color of an oil sample by comparing the oil sample with known color characteristics. AOCS method Cc 13b-45 is applicable to fats and oils provided no turbidity is present in the sample. Color values are quantitated by determining a red color value and a yellow color value using the AOCS method Cc 13b-45. Typically, crude corn oil isolated using wet milling methods has a red color value ranging from about 15 to about 20 and a yellow color value ranging from about 70 to about 80. Typically, crude corn oil isolated using dry milling methods has a red color value ranging from about 7 to about 10 and a yellow color value ranging from about 60 to about 70.

Color values are evaluated qualitatively by visual inspection of an oil. Typically, visual inspection results in an oil being classified as a light oil or a dark oil compared to a known oil color. For example, it is typical for crude oils isolated using wet milling techniques to be considered dark brown by visual inspection. Corn oils isolated using flaking methods described herein have oil colors that qualitatively are considered light and is generally lighter than crude corn oil color made using wet or dry milling techniques.

Corn meal isolated using flaking methods as described herein can be a low fat corn meal. For example, such a corn meal can have a meal fat content from about 0.2% to about 4.0%, or about 0.2% to about 3.0%, or about 0.2% to about 2.0%, or about 0.2% to about 1.5%, or about 0.4% to about 1.5%, or about 0.4% to about 1.2%, e.g., about 1.1%. Other quality parameters for oilseed meals include starch, protein, and moisture contents of the resulting meal. In some embodiments, protein content is from about 10% to about 20%, e.g., about 10% to about 18%, or about 11% to about 18%, or about 13% to about 18%. In some embodiments, starch content is from about 50% to about 70%, e.g., about 55% to about 70%, about 62% to about 70%, or about 64% to about 70%. In some embodiments, the fiber content is from about 2% to about 8%, or about 2% to about 6%, or about 2% to about 4%, e.g., about 3%. Meal fat, protein, starch and fiber contents for the above corn meals, are based on a moisture content of about 10%.

Methods for evaluating quality parameters of oilseed meals and corn meals are known. Corn meals derived using different methods or isolated at different times are compared by normalizing the meals to a common moisture content. The moisture content of an oilseed protein concentrate, such as a corn meal or whole corn, is determined using AOCS method Ba 2b-82. The crude fiber content of corn meal is determined using AOCS method Ba 6-84. AOCS method Ba 6-84 is useful for grains, meals, flours, feeds and all fiber bearing material from which the fat can be extracted leaving a workable residue. Crude protein content of corn meal is determined using AOCS method Ba 4e-93. The starch content of corn meal is determined using the Standard Analytical Methods of the Member Companies of the Corn Refiners Association Incorporated, 2d Edition, Apr. 15, 1986, method A-20 ("Corn Refiner's method A-20"). Meal fat content can be determined using AOCS method 3-38.

It is to be understood that the analytical methods provided herein are illustrative examples of useful methods for computing various quality parameters for the oils and meals described herein. Other suitable methods may be used to compute the quality parameters disclosed and claimed herein.

Novel methods for processing corn described herein facilitate a novel method for doing business, which can include the following steps. Corn seed that is effective for developing into a corn plant that produces corn grain having a total oil content of at least about 8% is made, used, sold or offered for sale. Advertisements, marketing strategies, or other suitable promotions concerning the corn seed are disseminated to the relevant audience. The advertisements indicate that corn grain harvested after planting the corn seed can be processed using flaking techniques or methods. The advertisements can further indicate that the flaking methods facilitate extracting a corn oil or can indicate that suitable flaking methods include methods that are used for processing oilseeds such as soybeans. Such a method is useful for marketing or selling corn seed to consumers in regions where oilseed processing plants that utilize flaking methods are physically located. The relevant audience includes farmers, seed corn dealers, oilseed processors, and other persons involved in the oilseed industry. Suitable advertisements include radio and television advertisements, labels or other indicia present on packages of corn seed, promotional meetings, random or directed mailings, hand bills, and any other form of communication directed to the relevant audience.

In another aspect, a novel method of doing business comprises the steps of buying, purchasing, or offering to buy corn grain having a high oil content for the purpose of processing the purchased grain by flaking the grain and extracting an oil therefrom. In so doing, a business may advertise that it is a facility that flakes high oil corn grain. In particular, the facility may flake corn for extracting corn oil and/or producing corn meal.

An article of manufacture can include packaging material and seed corn contained within the packaging material. Such seed corn produces a corn plant that yields corn grain having an oil content greater than about 8% which may be processed by flaking the corn grain and extracting an oil. Also included with the packaging material is a label or package insert that indicates that an oil can be extracted from the resulting corn grain by flaking the corn grain and extracting an oil or described herein. Any known packaging and printing method may be used to prepare the packaging material of the article of manufacture.

EXAMPLE 1

Processing High Oil Corn Using A Flaking Method

Shelled kernels of individual ears of yellow dent corn were screened for a total oil content greater than about 7% oil using a Perten bulk near infrared (NIR) seed tester™ (model 9100-H.F) Perten Instruments, P.O. Box 7398, Reno, Nev. 89510. Kernels from the ears having at least a 7% oil content were screened further for individual kernels having an oil content of at least 13% oil in a Brimrose seedmeister™ single kernel NIR tester (Brimrose Corp., Baltimore, Md.). The kernels were stored at a moisture content of about 13.5%. At the time of processing, the moisture content of the seed was about 10%.

A bench scale flaking apparatus containing a two inch stainless steel rod and plate was used to flake the whole corn grain. The whole corn grain sample was passed through the rollers four times to obtain a final flake thickness of about 0.01 inches. A miscella was extracted from the flaked corn grain using hot (60–65° C.) n-hexane and a Kimble™ model 585050 Soxhlet extractor. The resulting miscella and corn meal were desolventized. The miscella was desolventized by heating the miscella to 70° C. under a vacuum of 25 inches mercury. The corn meal was desolventized according to AOCS method Ba 2a-38.

The total recovered oil was determined to be 14.74% of the whole corn grain sample. The phosphorus content of the desolventized crude oil was determined to be 365 parts per million (ppm) using AOCS method Ca 12-55. The phospholipid concentration was determined to be 1.095% (0.0365%*30). The free fatty acid content was determined to be 0.2% using AOCS method Ca 5a-40. The neutral oil loss during processing was determined to be 1.3% (1.095%+ 0.2%). Using the same methods, crude oil extracted from normal, i.e., 3–4% total oil content, corn grain using conventional wet milling methods can be expected to have a phosphorous content from about 600 ppm to about 800 ppm, a free fatty acid concentration from about 0.5% to about 1.0 percent, and a neutral oil loss during processing ranging from about 3% to about 4%.

The color of the crude oil was visually evaluated and determined to be a light yellow color compared to a crude oil isolated using conventional wet milling methods, which was a dark brown color.

The desolventized corn meal was characterized using AOCS methods Ba 3-38, Ba 2b-82, Ba 6-84, and Ba 4e-93, and Corn Refiner's Method A-20. When normalized to a 10% moisture content, the corn meal had a 3.2% fiber content, a 65% starch content, and a 14% protein content. Meal fat was determined to be 1.07% using AOCS method 3-38. For comparison, corn gluten feed created using conventional wet milling methods and normalized to a 10% moisture content can be expected to contain an oil content of about 4%, a protein content of about 20%, and a fiber and other carbohydrate content of about 60%. Also for comparison, corn gluten meal created using conventional wet milling methods and normalized to a 10% moisture content can be expected to contain an oil content of about 3%, a protein content of about 60%, and a fiber and other carbohydrate content of about 22%.

To the extent not already indicated, it also will be understood by those of ordinary skill in the art that any one of the various specific embodiments herein described and illustrated may be further modified to incorporate features shown in other of the specific embodiments.

The foregoing detailed description has been provided for a better understanding of the invention only and no unnecessary limitation should be understood therefrom as some modification will be apparent to those skilled in the art without deviating from the spirit and scope of the appended claims. As such, other aspects, advantages, and modifications are within the scope of the following claims.

What is claimed is:

1. A method of processing corn grain, comprising the steps of:
   a) flaking corn grain having a total oil content of at least about 8%; and
   b) extracting an oil and a meal from said flaked corn grain, said meal having a meal fat content from about 0.2% to about 4.0% at a moisture content of about 10%.

2. The method of claim 1, wherein said meal has a fiber content of about 2% to about 8% and a protein content of about 10% to about 20%, at a moisture content of about 10%.

3. The method of claim 1, wherein said meal has a starch content of about 60% to about 70% at a moisture content of about 10%.

4. The method of claim 1, wherein said extracting step comprises pressing said flaked corn grain.

5. The method of claim 1 wherein said extracting step comprises solvent-based oil extraction of said flaked corn grain.

6. The method of claim 1, further comprising the step of adjusting the moisture content of said corn grain to about 10% prior to said flaking step.

7. The method of claim 1, wherein said corn oil has a phosphorous content of less than about 800 parts per million.

8. The method of claim 1, wherein said corn oil has a free fatty acid content of less than about 0.5%.

9. The method of claim 1, wherein said corn oil having a neutral oil loss of less than about 3%.

10. A corn meal having a meal fat content of about 0.2% to about 4.0% at a moisture content of about 10%.

11. The corn meal of claim 10, wherein said meal has a protein content of about 10% to about 20% at a moisture content of about 10%.

12. The corn meal of claim 11, wherein said meal has a fiber content of about 2% to about 8% at a moisture content of about 10%.

13. The corn meal of claim 12, wherein said meal has a starch content of about 50% to about 70%, at a moisture content of about 10%.

14. A method for processing corn grain comprising the steps of:
   a) flaking corn grain having a total oil content of at least about 8%; and
   b) extracting, without extrusion, an oil from said flaked corn grain.

15. The method of claim 14, further comprising the step of adjusting the moisture content of said corn grain to about 10% prior to said flaking step.

16. The method of claim 14 wherein said corn grain is whole corn grain.

17. The method of claim 14 wherein said corn grain has a total oil content of at least about 14%.

18. The method of claim 14 wherein said corn grain has a total oil content of at least about 12%.

19. The method of claim 14 wherein said corn grain has a total oil content of at least about 10%.

20. The method of claim 14 wherein said corn grain has a total oil content from about 12% to about 30%.

21. The method of claim 14 wherein said extracting step comprises solvent-based oil extraction of said flaked corn grain.

22. The method of claim 21 wherein said extracting step produces a miscella and a corn meal.

23. The method of claim 22 wherein said corn meal has a meal fat content of about 0.2% to about 4.0%.

24. The method of claim 23, wherein said corn meal has a protein content of about 10% to about 20% and a fiber content of about 2% to about 8%, at a moisture content of about 10%.

25. The method of claim 24, wherein said corn meal has a starch content of about 60% to about 70%, at a moisture content of about 10%.

26. The method of claim 22 further comprising the step of desolventizing said miscella to produce a crude corn oil.

27. The method of claim 26 wherein said corn oil has a light yellow color.

28. The method of claim 27 wherein said corn oil has a yellow color value ranging from about 60 to about 70 and a red color value ranging from about 6 to about 10, as determined by American Oil and Chemical Society method Cc 13b-93.

29. The method of claim 1, wherein said meal has a meal fat content of about 3.0%.

30. The corn meal of claim 10, wherein said meal has a meal fat content of about 3.0%.

31. The method of claim 23 wherein said corn meal has a meal fat content of about 3.0%.

* * * * *